UNITED STATES PATENT OFFICE.

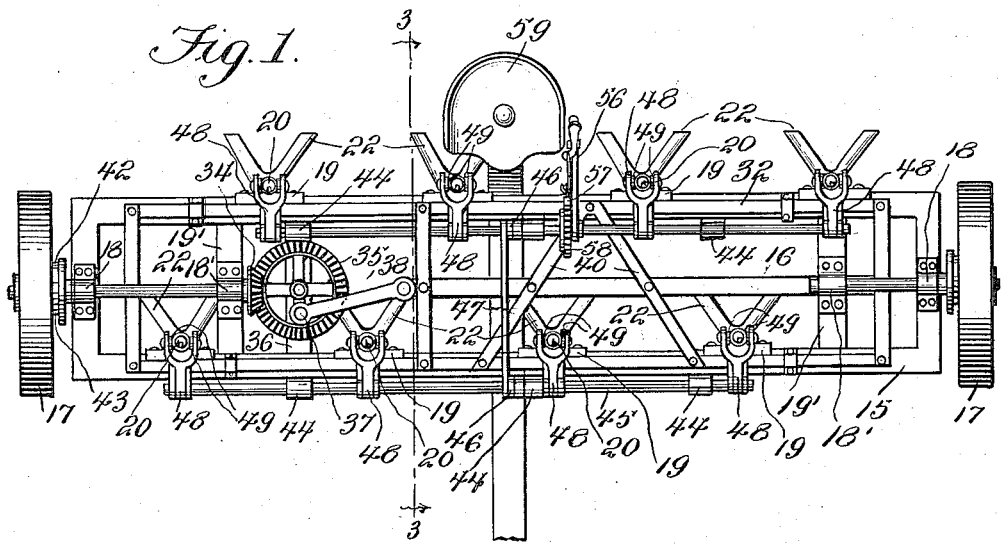

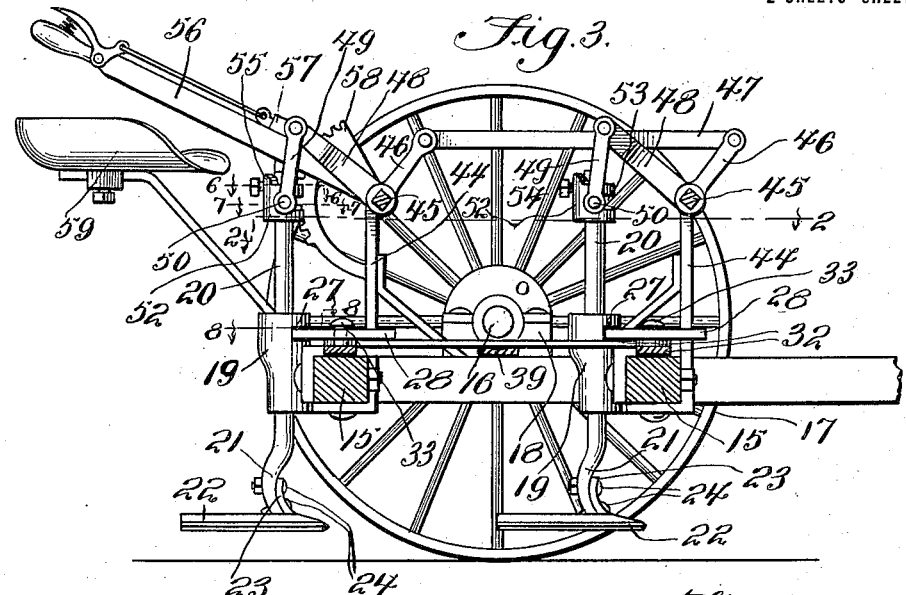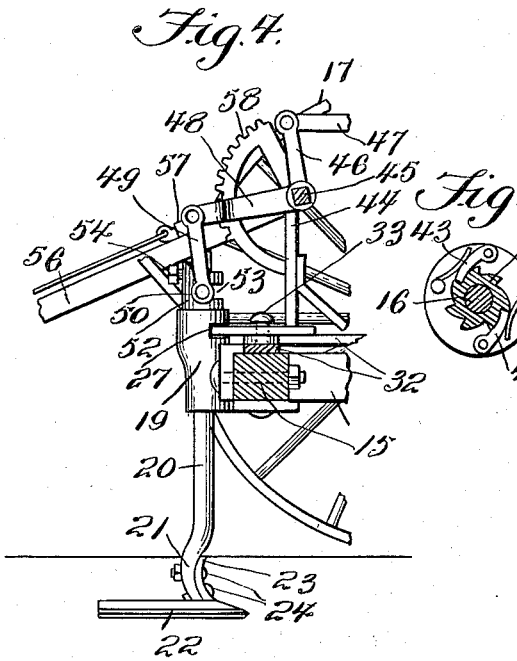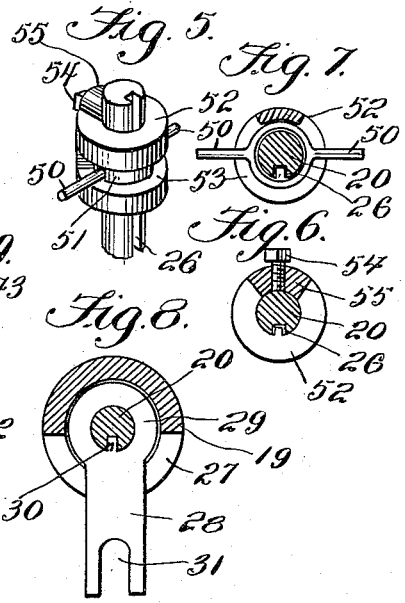

KARL F. GERHARD, OF HATTON, WASHINGTON.

WEEDER AND CULTIVATOR.

1,149,126.   Specification of Letters Patent.   Patented Aug. 3, 1915.

Application filed July 31, 1914. Serial No. 854,325.

*To all whom it may concern:*

Be it known that I, KARL F. GERHARD, a citizen of the United States, residing at Hatton, in the county of Adams and State of Washington, have invented new and useful Improvements in Weeders and Cultivators, of which the following is a specification.

This invention relates to weeders and cultivators of that class in which a plurality of standards carried by a frame are provided with approximately horizontally disposed triangular blades for the purpose of cutting the stalks, weeds and other plants slightly beneath the surface of the ground in order that the same may be eradicated.

The present invention has for its object to produce an improved construction whereby the blade carrying shanks are supported for vertical adjustment and also for axial rotation so that the blades will clear themselves of the stalks of weeds cut thereby.

Further objects of the invention are to simplify and improve the construction of the mechanism whereby the shanks are axially rotated and adjusted.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a top plan view of a machine constructed in accordance with the invention. Fig. 2 is a horizontal sectional view, enlarged, through one end of the machine taken on the line 2—2 in Fig. 3. Fig. 3 is a vertical sectional view taken on the line 3—3 in Fig. 1. Fig. 4 is a vertical sectional detail view taken on the line 4—4 in Fig. 1. Fig. 5 is a perspective detail view of a portion of one of the blade carrying shanks together with the adjusting collar. Fig. 6 is a sectional detail view taken on the line 6—6 in Fig. 3. Fig. 7 is a sectional detail view taken on the line 7—7 in Fig. 3. Fig. 8 is a sectional detail view taken on the line 8—8 in Fig. 3. Fig. 9 is a sectional detail view taken on the line 9—9 in Fig. 2.

Corresponding parts in the several figures are denoted by like characters of reference.

The main frame 15 of the improved machine is supported by axle members 16 having ground wheels 17, the end members of the frame being provided with bearing boxes 18 wherein the axle members are supported for rotation. Additional bearings 18' for the axle members are mounted on cross bars 19' of the main frame. Mounted on the front and rear side members of the frame are a plurality of bearing members 19 each constituting a housing in which a substantially vertical shank 20 is supported for axial rotation and for vertical slidable movement. Each shank terminates at its lower end in a foot 21 with which a substantially horizontal V-shaped blade 22 is connected, said blade being preferably provided with an upstanding lug 23 which is connected with the foot by a fastening member such as a bolt 24, it being understood that other connecting means may be employed when preferred. Each shank 20 is provided with a groove or key-seat 26 extending through the greater portion of its length from the upper end downward.

The housing 19 is provided above the top face of the main frame 15 with a horizontal slot 27 through which extends a lever arm 28 having at one end an eye 29 engaging the shank 20, said eye being provided with a lug 30 engaging the key-seat of the shank, which latter is thus vertically slidable with respect to the lever arm but capable of being rocked by the latter. Each lever arm is provided at its outer end with a slot 31.

Supported on the main frame for sliding movement thereon in a direction parallel to the axle 16 is a rectangular frame 32, the front and rear members of which are provided with studs 33 engaging the slots 31 of the lever arms 28. It follows that when the frame is reciprocated, the lever arms will be rocked, and the blade carrying shanks 20 will be axially rotated in their respective bearings.

For the purpose of actuating the reciprocatory frame one of the axle members 16 is equipped with a bevel pinion 34 meshing with a bevel gear 35 which is supported for rotation in an approximately horizontal plane on a cross bar 36. The bevel gear 35 is provided with a wrist pin 37 which is connected by a pitman 38 with a bar 39 which constitutes a part of the frame 32, extending longitudinally between the side members thereof and connected with said side members by diagonal braces 40 which also constitute portions of said frame. It will be seen that when the machine is in motion the frame will be reciprocated, thus transmitting axial rotary movement to the blade carrying shanks.

The ground wheel 17 associated with the axle member that carries the bevel pinion 34 is revolubly mounted on said axle member, but is connected for rotation therewith when the machine moves in a forward direction by means of a clutch device of common construction including spring actuated pawls 42 mounted on the hub of the wheel and engaging a ratchet wheel 43 on the axle member.

The main frame supports uprights 44 on which rock shafts 45 are mounted above the front and rear members of the main frame, said rock shafts being provided with cranks 46, the ends of which are pivotally connected with the ends of a connecting rod 47 in order that said rock shafts may operate in unison. The rock shafts 45 are provided with radially extending arms 48 which are terminally bifurcated, each of said arms being connected by means of links 49 with pintles or pivot members 50 extending from diametrically opposite sides of a sleeve 51 which is mounted on the shank 20. Each sleeve 51 is surrounded by a collar 52 having a horizontal slot 53 through which the pivot members 50 extend, said sleeve being provided with a set screw 54 whereby it is adjustably secured on the shank 20. The slot 52 extends through an arc of approximately 270 degrees so that the pivot members 50 will not interfere with the axial rotation of the shank 20, when the latter is rocked by the means provided for the purpose. The collar 52 is preferably provided with a lug 55 for the passage of the set screw 54 in order to avoid threading said screw through that part of the collar which is weakened by the slot 53. One of the rock shafts 45 is provided with a hand lever 56 having a stop member 57 engaging a rack segment 58, said lever being positioned in suitable proximity to the driver's seat 59.

It will be readily seen from the foregoing description that by manipulating the lever 56 the individual blade carrying shanks 20 may be raised or lowered and that said shanks may be sustained in any position to which they may be adjusted. It will be, furthermore, seen that the construction is such that in any position the blade carrying shanks will be rocked or axially rotated when the machine advances while backward movement of the machine will not result in rocking the blades, owing to the presence of the clutch device which constitutes a part of the transmission mechanism. The V-shaped cutting blades are of such extent, and the blades or wings thereof are placed at such an angle with respect to each other that at each axial rotation one wing will be presented in a straight line with respect to the advancing movement of the machine. The cutting blades will thus be enabled to clear themselves of the stalks, leaves and rubbish engaged thereby, and the operation of the machine will be unimpeded and thoroughly effective.

Having thus described the invention, what is claimed as new, is:—

1. In a machine of the class described, a wheel supported frame, housings carried thereby, and blade carrying shanks mounted in said housings for vertical adjustment and for axial rotation, each shank having a vertical groove, a lever arm in slidable engagement with each shank and having a lug engaging the groove, and means for rocking the lever arms.

2. In a machine of the class described, a wheel supported frame, a housing carried thereby and having a horizontal slot, a vertically grooved shank slidable through the housing and capable of rotating axially therein, a lever arm in slidable engagement with the shank and having a lug engaging the groove therein, said lever arm extending through the slot in the housing, and means for rocking the lever arm.

3. In a machine of the class described, a wheel supported frame, a housing carried thereby and having a horizontal slot, a blade carrying shank slidable through the housing and capable of rotating axially therein, a lever arm extending through the slot of the housing, said arm being connected with the shank to rock the latter, and means for rocking the lever arm.

4. In a machine of the class described, a wheel supported frame, a housing carried thereby, a blade carrying shank slidable through the housing, a lever arm having an eye through which the shank slides, said arm being connected with the shank to rotate axially the latter, means for rocking the arm, and means for effecting vertical adjustment of the shank while permitting it to rotate freely.

5. In a machine of the class described, a wheel supported frame, a housing carried thereby and having a horizontal slot, a lever extending through the slot of the housing and having an eye within the housing, said eye being provided with a lug, a blade carrying shank slidable through the housing and the lever eye, said shank having a groove engaged by the lug, a sleeve mounted loosely on the shaft and having laterally extending pivot members, a collar surrounding the sleeve and having a slot through which the pivot members extend, said collar being adjustably secured on the shank, means connected with the pivot members of the sleeve for effecting vertical adjustment of the shank through the housing and the lever eye, and means for rocking the lever to impart axial rotation to the shank.

In testimony whereof I affix my signature in presence of two witnesses.

KARL F. GERHARD.

Witnesses:
W. J. HARTER,
J. H. SEXSON.

Copies of this patent may be obtained for five cents each, by addressing the "Commissioner of Patents, Washington, D. C."